Figure 1:
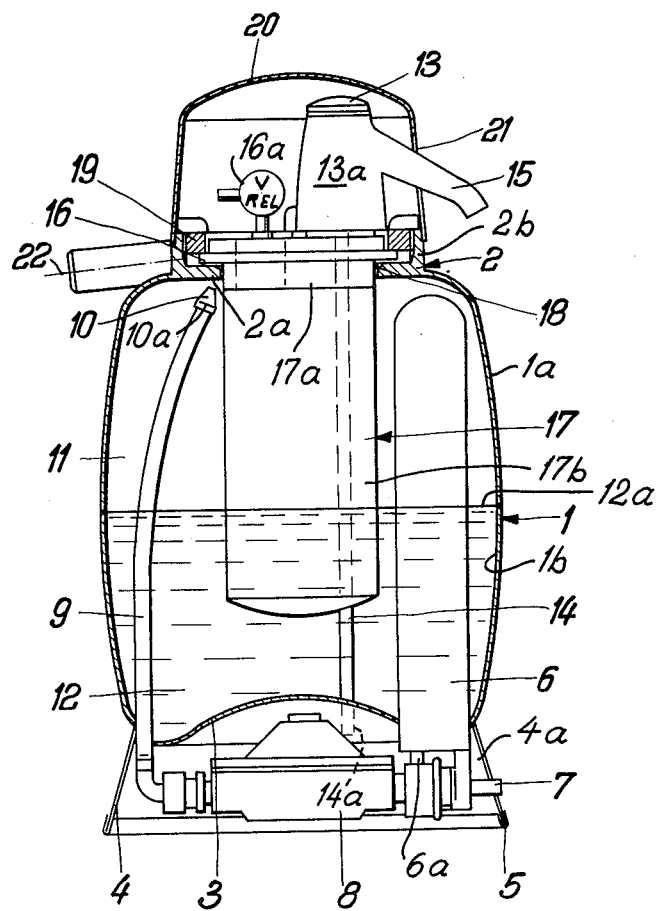

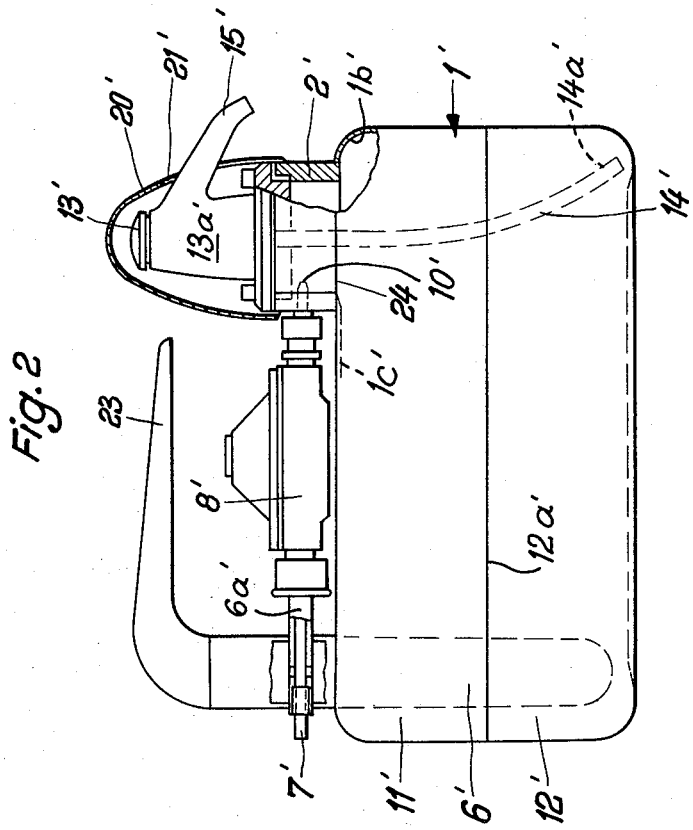

3,161,327
SIPHON DISPENSER
Franz Kraus, Cologne-Lindenthal, Germany, assignor to Wilhelm Schmidding, Cologne-Niehl, Germany
Filed Dec. 7, 1962, Ser. No. 243,083
Claims priority, application Germany, Feb. 15, 1962, Sch 30,999
6 Claims. (Cl. 222—394)

The present invention relates to dispensers for liquids, and more particularly to a siphon dispenser wherein a liquid phase is subjected to constant pressure by a gaseous phase so that the liquid phase is automatically expelled as soon as the dispensing valve of the dispenser is caused to open and to provide a path for escape of the liquid phase. For example, the siphon dispenser of this invention may be utilized for storage of all types of carbonated beverages, such as soda, fruit juices, beer, wine and many others.

It is an important object of the present invention to provide a comparatively simple and inexpensive siphon dispenser for beer, soda, wine and certain other types of liquids which is constructed and assembled in such a way that the supply of liquid phase and the supply of gaseous phase may be rapidly and conveniently replenished as often as desired.

Another object of the invention is to provide a siphon dispenser of the just outlined characteristics which may be furnished in all sizes and shapes so that it may serve as a portable or as a permanently installed unit for use in households, on picnics, in restaurants, pubs, bars, grills and many other types of commercial establishments.

A further object of the invention is to provide a siphon dispenser which may be readily manipulated be semi-skilled or unskilled persons without any danger to the operator, wherein the liquid phase is automatically mixed with requisite quantities of the gaseous phase at the time it is being discharged from the dispenser, and wherein the influence of the gaseous phase upon the liquid phase does not change to any appreciable extent in response to and as a result of progressive evacuation of the liquid phase.

An additional object of the invention is to provide a siphon dispenser of the above outlined characteristics which, among many other advantageous uses, is especially suited for storage of beer and other carbonated beverages, and which is constructed in such a way that beer cannot become stale even if only a very small quantity thereof remains in the dispenser and even if such small quantity of beer is kept in the dispenser for extended periods of time.

A concomitant object of the invention is to provide a siphon dispenser for beer, soda, fruit juices, wine and many other types of alcoholic or non-alcoholic liquids wherein all such component parts which require frequent inspection, attention or replacement are readily accessible without necessitating dismantling of the remaining component parts and wherein the parts through which the liquid and/or the gaseous phase must be refilled may be readily connected to conventional sources of liquid or gaseous substances, for example, to a large vessel which contains compressed carbon dioxide gas or to a large barrel which contains a supply of beer or another liquid which is to be dispensed in predetermined quantities as the need for such dipensal arises.

Still another object of the instant invention is to provide a siphon dispenser of the above outlined characteristics which may be constructed and assembled in such a way that it may be readily stored in a conventional refrigerator so that it need not always be provided with its own cooling means.

A further object of the invention is to provide a siphon dispenser for beer and for other types of carbonated beverages wherein the pressure of the gaseous phase may be selected and adjusted in a very simple manner without necessitating complete dismantling of the apparatus and without necessitating expert help for such adjustment.

Still another object of the invention is to provide a siphon dispenser which is constructed in such a way that any reaction between the liquid and/or gaseous phase on the one hand and the material of the dispenser on the other hand is effectively prevented so that the liquid phase remains unchanged and that the material of the dispenser remains unaffected for any desired period of time.

With the above objects in view, the invention resides in the provision of a siphon dispenser in which a gaseous phase (e.g., carbon dioxide or air) subjects a liquid phase (e.g., beer, soda, fruit juice or wine) to a predetermined pressure which is higher than atmospheric pressure. The dispenser comprises a refillable container defining an internal chamber having a liquid phase-receiving lower portion and a gaseous phase-receiving upper portion, a refillable receptacle (such as an elongated cartridge of cylindrical shape) which is secured to the container and which is adapted to receive a supply of gaseous phase at a pressure higher than the predetermined pressure prevailing in the internal chamber of the container, and control valve means operatively connected with the receptacle and communicating with the internal chamber of the container for automatically admitting gaseous phase into the internal chamber whenever the pressure of gaseous phase above the surface of the liquid phase drops below the predetermined pressure.

Certain other features of the invention reside in the provision of special control valve means, in the provision of a coolant-containing tank which is capable of cooling the liquid phase in the interior of the container as well as during evacuation and/or refilling of the container with a liquid phase, in the provision of a specially constructed standpipe which constitutes a component part of the means for dispensing liquid phase from and for introducing a new supply of liquid phase into the container, in the provision of specially constructed handgrip or handle means for the container which simultaneously forms a coolant-containing receptacle, and in such mounting of the control valve means that at least some of its components are accessible at all times without necessitating dismantling of the dispenser.

The novel features which are considered as characteristic of the invention are set forth in particular in the appended claims. The invention itself, however, both as to its construction and its method of operation, together with additional objects and advantages thereof will be best understood from the following detailed description of certain specific embodiments with reference to the accompanying drawings, in which:

FIG. 1 is a vertical section through a siphon dispenser which embodies one form of the invention; and FIG. 2 is a partly elevational and partly vertical sectional view of a modified dispenser which may be accommodated in a conventional refrigerator.

Referring now in greater detail to the drawings, and first to FIG. 1, there is shown a siphon dispenser which comprises a container 1. This container preferably assumes the form of a seamless body made of aluminum or another metallic substance, for example, by a pressing process or in accordance with another known method. The upper end portion of the container defines a round opening which accommodates an internally threaded supporting ring 2, this ring being welded or otherwise secured to the upper edge portion of the container. For example, the ring 2 may be formed by a casting or molding process or it may be machined from a block of aluminum or another suitable metal which can be welded to the material of the container. The bottom wall 3 of the container is of concavo-convex shape with its concave side facing downwardly. The side wall or mantle 1a of the container resembles a barrel but it is equally possible to utilize containers with conical, cylindrical or polygonal mantles. If desired, the mantle 1a may be reinforced by vertically extending ribs, corrugations or other suitable stiffening means. The bottom wall 3 is surrounded by an outwardly and downwardly extending conical skirt 4 which is welded to the mantle 1a and whose lower edge portion is received in an elastic cushion here shown as a U-shaped rubber strip 5 which comes to rest on a horizontal plate or the like whereon the dispenser of the present invention is put to actual use.

The internal chamber 1b of the container 1 accommodates an upstanding elongated cylindrical receptacle here shown as a cartridge 6 which is of the rechargeable or refillable type and whose lower end portion projects through the bottom wall 3 and into the space 4a defined by the skirt 4. This skirt may consist of several arcuate sections, or it may define a lateral passage for a refilling nipple 7 of the cartridge 6. When the cartridge 6 is freshly loaded with carbon dioxide gas, with air or with another gaseous substance, the pressure prevailing in its interior may be in the range of 8 atmospheres absolute pressure. It is assumed that the cartridge 6 contains carbon dioxide gas and that the liquid phase 12 filling the lower portion of the chamber 1b is beer. When the user depresses an actuating member 13, here shown as a pushbutton which forms part of a normally closed liquid dispensing valve 13a of any known design, some beer will escape through an upwardly extending standpipe 14, through the valve 13a and through a spout 15 which is connected to the housing of the valve 13a. The parts 13, 13a, 14, 15 together constitute a dispensing means through which the liquid phase may be introduced into or evacuated from the container 1. The liquid phase is being expelled in response to a predetermined gas pressure prevailing in the upper portion 11 of the chamber 1b and produced by the gas discharged from the cartridge 6 through a normally closed reducing valve 8, through a conduit 9 which passes through the bottom wall 3 and into the upper portion 11 of the chamber 1b, and through a specially constructed normally closed constant-pressure outlet valve 10 which is provided at the upper end of the conduit 9. The valves 8, 10 and the conduit 9 together form a control valve means which reduces the pressure of gas discharge from the cartridge 6 to the pressure necessary in the chamber 1b. In the embodiment of FIG. 1, the valve 10 assumes the form of an elastic cap having a conical tip and a small lateral slit 10a through which controlled quantities of carbon dioxide gas may flow into the upper portion 11 of the chamber 1b to exert pressure upon the surface 11a of the liquid phase 12 which fills the lower portion of this chamber. The configuration of the slit 10a is such that the valve 10 prevents return flow of carbon dioxide gas into the conduit 9, i.e., the gaseous phase filling the upper portion 11 of the chamber 1b can escape only through the standpipe 14 and through the valve 13a but cannot flow back to the reducing valve 8 and cartridge 6. Of course, the valve 10 also prevents entry of beer into the conduit 9, i.e., this is a one-way valve. The upper portion 11 of the chamber 1b may be filled with carbon dioxide gas at a pressure of 0.2–0.4 atmosphere absolute pressure, depending on the exact type and setting of the control valve means 8–10.

The reducing valve 8 may assume the form of a conventional diaphragm valve with or without adjusting means and, as explained hereinabove, its setting may be such that it produces a drop in pressure from 8 to 0.2–0.4 atmosphere absolute pressure. In other words, irrespective of the pressure prevailing in the cartridge 6, the pressure of gas filling the conduit 9 and the upper portion 11 of the chamber 1b will be maintained at a predetermined value, e.g., 0.2 atm. As soon as the pressure in the upper portion 11 drops (i.e., when the user actuates the pushbutton 13 to permit outflow of beer through the spout 15), the pressure of gas filling the conduit 9 will drop immediately because some gas will escape through the slit 10a whereby the valve 8 opens in a fully automatic way and its lower-pressure outlet permits outflow of gas from the cartridge 6 until the pressure prevailing in the conduit 9 and in the upper portion 11 returns to 0.2 atm. The valve 8 then closes in a fully automatic way and permits outflow of additional carbon dioxide gas only in response to renewed actuation of the pushbutton 13. In other words, the valve 8 insures at all times that the pressure prevailing in the upper portion 11 of the chamber 1b cannot exceed a predetermined magnitude such as is necessary to cause immediate outflow of beer in response to depression of the pushbutton 13, and also to prevent deterioration of beer in the lower portion of the chamber 1b.

FIG. 1 shows that the inwardly extending annular flange 2a of the supporting ring 2 serves as a support for an annular element 16 which is rigid with a coolant-containing tank 17. This tank may assume the form of a cylindrical body which is refillable with crushed ice, ice cubes, Dry Ice or with another suitable coolant. The gap between the periphery of the tank 17 and the flange 2a is sealed by an annular packing 18 which may assume the form of a compressible cord or the like. As shown, the upper portion 17a of the tank 17 is detachable from the lower portion 17b thereof so that the lower portion 17b may be refilled with coolant.

The upstanding cylindrical portion 2b of the ring 2 is formed with internal threads which mate with external threads of a sealing or clamping ring 19 serving as a means for sealingly pressing the annular element 16 against the upper side of the flange 2a. The tank 17 may consist of aluminum and is preferably manufactured by the same method as the container 1. The ring 19 serves as a second sealing means to prevent escape of the gaseous phase from the upper portion 11 of the chamber 1b.

The standpipe 14 extends through the tank 17 so that beer flowing upwardly toward the valve 13a is automatically cooled by heat exchange with ice cubes or another coolant contained in the tank 17. The lower end portion 14a of the standpipe 14 extends into close proximity of the bottom wall 3. Of course, the coolant contained in the tank 17 will also cool inflowing beer which is refilled through the spout 15 upon depression of the pushbutton 13. When the internal chamber 1b is being refilled with beer, the pressure of the gaseous phase in the upper portion 11 of this chamber rises automatically and, if this pressure should reach an undesirably high value, it opens a pressure relief valve 16a which is mounted on the annular element 16 and which is preferably set in such a way that it opens in response to a pressure of about 0.4 atmosphere absolute pressure if the predetermined pressure in the upper portion 11 of the chamber 1b is about 0.2 atmosphere. This valve will open automatically to discharge some gas from the chamber 1b when the container is being refilled with beer.

As indicated by broken lines, the lower end portion 14a of the standpipe 14 preferably assumes the form of a Venturi to insure that the gas-enriched liquid phase ascending toward the valve 13a will not produce excessive quantities of foam. Such excessive foaming could take place if the gaseous phase were permitted to escape at a very high rate of speed.

In accordance with a further feature of the invention, the reducing valve 8 is accommodated in the space 4a, i.e., externally of the container 1. This is of considerable advantage because this valve is readily accessible at all times without necessitating opening of the container. For example, it might become necessary to replace this valve by a new one or to adjust its setting if one desires to increase the pressure of the gaseous phase above the liquid surface 12a.

The cartridge 6 preferably assumes the form of an elongated cylinder which is welded to the bottom wall 3. This cylinder may consist of aluminum and is preferably manufactured by the same method as the container 1.

In order to prevent accidental discharge of liquid when the dispenser of the present invention is in shipment and when the chamber 1b is at least partially filled with beer or another liquid, it is preferred to provide a cap 20 which is made of aluminum or of another suitable metallic substance and which is applied around the upstanding cylindrical portion 2b of the ring 2. This cap is formed with a slot 21 for the spout 15.

The cartridge 6 may discharge compressed gas to the higher-pressure inlet of the reducing valve 8 through a suitable passage which is controlled by a one-way valve 6a, e.g., a tire valve. This valve 6a permits recharging of the cartridge through the nipple 7. A similar tire valve is installed in the nipple 7 to prevent escape of compressed gas from the cartridge.

Since the siphon dispenser of FIG. 1 is preferably a lightweight portable device, the container 1 is provided with one or more handgrip members or handles 22 which may be pivotally or rigidly secured to the ring 2 or to another part of the dispenser. It is preferred to provide a readily detachable connection (such as one or more screws or the like) for each of the handgrip members 22.

As a rule, the internal surface of the container 1 is coated with a protective layer or film which prevents direct contact between the metallic material of the container and the liquid. Thus, the taste of beer could be affected by direct contact with a wall structure consisting of aluminum. Furthermore, and assuming that the liquid phase contained in the space 1a is likely to react with and to attack the material of the container, a suitable film of protective material will effectively prevent such reaction. For example, and provided that the container 1, the tank 17 and the cartridge 6 consist of aluminum, they may be anodized to form thereon an oxide layer with or without previous burnishing of metallic surfaces. Of course, it is equally possible to provide these metallic parts with coatings of suitable synthetic plastic material which can resist the action of gaseous liquid phases in the space 1b.

If the improved dispenser is utilized in a restaurant, bar or grill for storage and controlled dispening of beer, it is put to use as follows:

In the first step, the cartridge 6 is charged with carbon dioxide gas so that the pressure in this cartridge rises to about 8 atmospheres asbolute pressure. As described hereinabove, gas flows automatically through the valve 8 and into the conduit 9 to be discharged through the valve 10 at a substantially reduced pressure of, for example, 0.2 atmosphere absolute pressure. In the next step, beer is admitted from a barrel or from another source through a flexible hose or the like which is attached to the spout 15 by simultaneous depression of the pushbutton 13 so that the valve 13a is open and that it permits inflow of beer into the lower part of the chamber 1b. The pressure of carbon dioxide gas in the upper portion 11 of the chamber 1b begins to rise at the same rate at which newly introduced beer fills the lower portion of this chamber and, in response to a preselected pressure, the safety valve 16a opens in a fully automatic way and permits excess gas to escape into the atmosphere. As explained hereinabove, the setting of the safety valve 16a may be such that it opens at 0.2 atmosphere absolute pressure if the setting of the valve 8 is selected with a view to produce in the chamber 1b a pressure of 0.2 atmosphere asbolute pressure. The operator knows that the chamber 1b is filled with beer as soon as some beer begins to escape through the safety valve 16a.

It will be readily understood that the pressure of carbon dioxide, air, another gas or mixture of two or more gases must be high enough to insure that the gas is satisfactorily mixed with the liquid and that such gas immediately begins to expel the liquid as soon as the valve 13a opens.

FIG. 2 illustrates a slightly modified dispenser wherein certain parts analogous to those described in connection with FIG. 1 are identified by similar reference numerals each followed by a prime. The container 1' assumes the shape of a large-diameter cylinder of comparatively small height whose top wall 1c' is formed with an opening 24 surrounded by a ring 2'. The reducing valve 8' is located above the top plate 1c' but beneath a substantially horizontal handgrip member or handle 23 which latter is preferably hollow so that it may form a portion of a cartridge 6'. This cartridge is welded to the top wall 1c' and extends into the internal chamber 1b' of the container 1'. The interior of the cartridge 6' may be refilled with carbon dioxide or another gas through a nipple 7', and a suitable valved passage 6a' connects the cartridge with the reducing valve 8'. The lower-pressure outlet of the valve 8' delivers gas at reduced pressure directly into the opening 24 so that the gas may fill the upper portion 11' of the chamber 1b'. In other words, the conduit 9 and the valve 10 may be dispensed with so that the reducing valve 8' by itself constitutes the control means of this dispenser.

The liquid phase is discharged through a stand-pipe 14' whose Venturi-shaped lower end 14a' dips into the bottom zone of the chamber 1b'. The construction of the liquid dispensing valve 13a', of its actuating means 13' and of the spout 15' is the same as described in connection with FIG. 1. The cap 20' is formed with a slit 21' for the spout 15'. The liquid phase 12' is assumed to fill the chamber 1b' up to the level 12a'.

It will be noted that the siphon dispenser of FIG. 2 is without a coolant-containing tank. This is due to the fact that this dispenser is intended for storage in a conventional refrigerator so that the liquid is cooled through the container 1'. The small height of the container 1' is of particular advantage when the dispenser is to be kept in a refrigerator.

For example, the siphon dispenser of FIG. 1 or 2 may be constructed with a view to accommodate between 5 and 50 liters of a liquid phase. Such dispensers are especially useful in restaurants, beer halls, grills, bars, pubs and other establishments which sell beer and similar beverages. Instead of utilizing carbon dioxide gas, the dispenser may be operated with compressed sterilized air or with another suitable gaseous substance.

Since the previously described reducing valve 8 or 8' insures that the pressure in the upper portion 11 or 11' of the container 1 or 1' remains unchanged independently of the extent to which the internal chamber 1b or 1b' is filled with a liquid substance, the liquid will not become stale and will not lose or change its taste in any other way even if very small quantities of such liquid remain in the container for very long periods of time. Thus, it is not necessary to evacuate the container at the end of each day or at the end of each week because the valves insure that the pressure upon the liquid phase remains unchanged irrespective of the extent to which the container is filled with liquid.

Without further analysis, the foregoing will so fully reveal the gist of the present invention that others can, by applying current knowledge, readily adapt it for various applications without omitting features that, from the standpoint of prior art, fairly constitute essential characeristics of the generic and specific aspects of this invention and, therefore, such adaptations should and are intended to be comprehended within the meaning and range of equivalence of the following claims.

What is claimed as new and desired to be secured by Letters Patent is:

1. A siphon dispenser in which a gaseous phase subjects a liquid phase to a predetermined pressure, comprising a refillable container defining an internal chamber having a liquid phase-receiving lower portion and a gaseous phase-receiving upper portion; a refillable receptacle secured in said container and adapted to receive a supply of gaseous phase at a pressure higher than said predetermined pressure; control valve means operatively connected with said receptacle and communicating with said chamber for automatically admitting gaseous phase into said chamber whenever the pressure of gaseous phase in said chamber drops below said predetermined pressure and flow control means for selectively admitting and dispensing liquid from said chamber, said flow control means being arranged to admit liquid to said chamber in the presence of said gaseous phase after the supply of liquid in said chamber has been depleted in response to dispensing thereof through said flow control means.

2. A siphon dispenser in which a gaseous phase subjects a liquid such as beer or the like to a predetermined pressure, comprising a refillable container defining an internal chamber having a liquid receiving lower portion and a gaseous phase-receiving upper portion; a refillable receptacle secured in said container and adapted to receive a supply of gaseous phase at a pressure higher than said predetermined pressure control valve means, control valve means operatively connected with said receptacle and communicating with said chamber for automatically admitting gaseous phase into said chamber whenever the pressure of gaseous phase in said chamber drops below said predetermined pressure, flow control means for selectively admitting and dispensing liquid from said chamber, said flow control means comprising a standpipe having a lower end extending into the lower portion of said chamber and being arranged to admit liquid to said chamber after the supply of liquid in said chamber has been depleted in response to dispensing thereof through said flow control means; and normally closed relief valve means mounted externally of said container for releasing gaseous phase from said chamber in response to liquid being admitted to said chamber through said flow control means, such liquid being admitted in the presence of said gaseous phase free of contact with the atmosphere and at a pressure at least slightly above said predetermined pressure so as to compress said gaseous phase to a pressure above said predetermined pressure.

3. A siphon dispenser in which a gaseous phase subjects a liquid phase to a predetermined pressure, comprising a refillable container defining an internal chamber having a liquid phase-receiving lower portion and a gaseous phase-receiving upper portion; a refillable cartridge secured in said container and adapted to receive a supply of gaseous phase at a pressure substantially higher than said predetermined pressure; nipple means provided on said cartridge for permitting refilling of the cartridge with the gaseous phase; flow control means for selectively admitting and dispensing liquid from said chamber, said flow control means comprising a valve-controlled standpipe having a lower end extending into the lower portion of said chamber and being arranged to admit liquid to said chamber after the supply of liquid in said chamber has been depleted in response to dispensing thereof through said flow control means; control valve means operatively connected with said cartridge and communicating with said chamber for automatically admitting gaseous phase into said chamber whenever the pressure of gaseous phase in said chamber drops below said predetermined pressure; and normally closed relief valve means mounted externally of said container for releasing gaseous phase from said chamber in response to the admission of liquid to said chamber, whereby the pressure of said gaseous phase is caused to rise above said predetermined pressure.

4. A siphon dispenser in which a gaseous phase subjects a liquid phase to a predetermined pressure, comprising a refillable container defining an internal chamber having a liquid phase-receiving lower portion and a gaseous phase-receiving upper portion; a refillable cartridge secured in said container and adapted to receive a supply of gaseous phase at a pressure substantially higher than said predetermined pressure, said cartridge comprising a first portion received in said chamber and a second portion extending from said container, said second portion constituting a handgrip means; nipple means provided on said cartridge for permitting refilling of the cartridge with the gaseous phase; dispensing means for the liquid phase comprising a valve-controlled standpipe having a lower end extending into the lower portion of said chamber; and control valve means operatively connected with said cartridge and communicating with said chamber for automatically admitting gaseous phase into said chamber whenever the pressure of gaseous phase in said chamber drops below said predetermined pressure.

5. A siphon dispenser as set forth in claim 4, wherein said container comprises a top wall and wherein said handgrip means is located above and is spaced from said top wall, said control valve means comprising a reducing valve supported by said top wall beneath said handgrip means.

6. A siphon dispenser in which a gaseous phase subjects a liquid phase to a predetermined pressure, comprising a refillable container defining an internal chamber containing gas at said predetermined pressure, said chamber having a lower portion and an upper portion; liquid admitting means extending into said lower portion for admitting liquid thereto at a pressure above said predetermined pressure; and relief valve means mounted externally of said chamber for releasing gas contained therein in response to admission of liquid into said chamber so that gas displaced by the admitted liquid escapes through said valve means whereby the pressure within the chamber is maintained at said predetermined value.

References Cited by the Examiner

UNITED STATES PATENTS

| | | | |
|---|---|---|---|
| 2,620,107 | 12/52 | Tolan | 222—399 X |
| 2,660,343 | 11/53 | Charpiat | 222—399 X |
| 2,976,897 | 3/61 | Beckworth | 222—399 X |
| 3,065,883 | 11/62 | Nelson | 222—399 X |
| 3,074,700 | 1/63 | Buttner et al. | 62—400 X |

FOREIGN PATENTS

| | | |
|---|---|---|
| 104,031 | 5/38 | Australia. |

LOUIS J. DEMBO, *Primary Examiner.*